United States Patent [19]

Shimogori et al.

[11] 4,406,761
[45] Sep. 27, 1983

[54] METHOD OF DESCALING METAL SHEETS

[75] Inventors: Kazutoshi Shimogori, Kobe; Kazuichi Kajiwara, Kakogawa; Kenji Miki, Himeji; Toshio Fukutsuka, Kobe, all of Japan

[73] Assignee: Kabushiki Kaisha Kobe Seiko Sho, Kobe, Japan

[21] Appl. No.: 257,096

[22] Filed: Apr. 24, 1981

[30] Foreign Application Priority Data

May 1, 1980 [JP] Japan ................................. 55-58879
Feb. 10, 1981 [JP] Japan ................................. 56-18710

[51] Int. Cl.³ ........................... C25F 1/04; C25F 7/00
[52] U.S. Cl. ................................. 204/144.5; 204/209
[58] Field of Search ................. 204/144.5, DIG. 10, 204/209, 224 R

[56] References Cited

U.S. PATENT DOCUMENTS

| | | | |
|---|---|---|---|
| 1,894,670 | 1/1933 | Coulin | 204/144.5 |
| 2,372,599 | 3/1945 | Nachtman | 204/144.5 |
| 2,590,927 | 4/1952 | Brandt | 204/144.5 |
| 3,048,528 | 8/1962 | Covington | 204/144.5 |
| 3,619,383 | 11/1971 | Eisner | 204/35 R |
| 3,779,887 | 12/1973 | Gildone | 204/224 R |

OTHER PUBLICATIONS

"The Hitachi Hyoron", vol. 58, No. 9, (1976–1979) by K. Hata et al.

Primary Examiner—T. M. Tufariello
Attorney, Agent, or Firm—Oblon, Fisher, Spivak, McClelland & Maier

[57] ABSTRACT

An efficient method of descaling metal sheets, such as titanium and stainless steel sheets, which includes carrying out anodic electrolysis using a metal sheet as the anode while sliding an abrasive member relatively to and on the surface of the metal sheet, is disclosed. The abrasive member essentially constitutes a fabric-like material made of synthetic resin.

7 Claims, 6 Drawing Figures

METHOD OF DESCALING METAL SHEETS

BACKGROUND OF THE INVENTION

1. Field of the Invention

This invention relates to a method of descaling metal sheets, especially titanium and stainless steel sheets. In particular, it relates to a method of descaling such metal sheets which includes the step of subjecting the metal sheets to anodic electrolysis in an electrolytic solution.

2. Description of the Prior Art

Metal sheets, such as titanium sheets and stainless steel sheets, are generally produced by the steps of hot rolling or hot stripping, cold rolling, annealing and skinpass rolling. Hot coils obtained from hot strip mills as well as sheets after annealing have scales consisting essentially of oxides (e.g. $TiO_2$, $Fe_2O_3$, $FeO$, $Cr_2O_3$ etc.) and surface defects inevitably formed during rolling steps. When they are rolled as they are, the surface of the product sheets is impaired and the products lose their value. Therefore, descaling treatment is essential prior to cold rolling of hot coils or skinpass rolling following annealing. These scales are stable or insoluble in usual pickling solutions, such as hydrochloric acid and sulfuric acid, and therefore satisfactory descaling cannot be achieved with such usual pickling solutions.

The conventional method exclusively used for descaling titanium sheets includes the step of immersing titanium sheets in a mixed acid solution containing hydrofluoric acid and nitric acid in concentrations of 1–4.5% and 3–20%, respectively, whereby scales are dissolved and removed. Thus nitric-hydrofluoric mixed acid solution is highly capable of dissolving titanium oxides and achieves such a high efficiency that the descaling rate amounts to about 3 microns per minute. However, the nitric-hydrofluoric mixed acid solution is very strongly corrosive and thus requires a treatment plant with a high degree of anticorrosiveness treatment. For these and other reasons, the production line has to bear a heavy burden with respect to the cost of production. Also, the waste solution poses a problem of environmental pollution.

For descaling stainless steel sheets, it has been proposed to immerse the sheets in a variety of mixed or combined acid washing solutions, such as a sulfuric acid-sodium chloride solution, a hydrochloric-nitric acid solution, a sulfuric-hydrochloric acid solution, a sulfuric acid-ferric sulfate solution, hydrochloric acid-ferric chloride solution and a hydrofluoric-nitric acid solution. Especially, a mixed acid solution containing hydrofluoric acid and nitric acid in concentrations of 1–5% and 3–10%, respectively, has exclusively been in practical use in treating stainless steel sheets by immersing the same therein for the purpose of descaling because the solution achieves such a high treatment efficiency that it is highly capable of dissolving oxides and achieves a treatment efficiency as high as about 2.3 microns per minute. However, as mentioned above, the nitric-hydrofluoric acid solution is highly corrosive and thus requires treatment equipment having a high degree of anticorrosiveness and the waste solution poses a problem of environmental hazards. Moreover, an adequate bath control is required for maintaining the treatment velocity at a constant level, but such control is burdensome. Consequently, this method of descaling is not an adequate one to be employed in a continuous production line.

Furthermore, K. Hata et al. describes the present status of electrolytic descaling of stainless steel using neutral electrolyte [(The Hitachi Hyoron, vol. 58, No. 9 (1976-9)], and S. Elsner discloses a process and apparatus for continuously electrodepositing metal of relatively uniform thickness on a moving metal substrate at extremely high plating rates (U.S. Pat. No. 3,619,383).

SUMMARY OF THE INVENTION

In these circumstances, light of an object of the present invention is to provide a method of descaling metal sheets which is highly efficient and can easily be controlled, and to provide a descaling effect at least comparable to pickling with a nitric-hydrofluoric mixed acid solution in a simple manner by carrying out anodic electrolysis in a conventional pickling solution using a metal sheet as the anode while sliding an abrasive member on the surface of the metal sheet, whereby the use of such nitric-hydrofluoric acid can be eliminated.

As a method of electrolytically pickling titanium sheets, a method including the step of carrying out anodic electrolysis in a nonaqueous, methanolic solution has been reported. Although this method can allegedly achieve rates of pickling comparable to a nitric-hydrofluoric mixed acid but involves a great risk of explosion of the electrolytic solution, which prevents it from being practiced on a commercial scale.

Also, as a method of descaling stainless sheets by electrolysis, a method has been proposed which includes the step of carrying out anodic electrolysis in the presence of a neutral electrolyte mainly composed of sodium nitrate or potassium nitrate. However, it is required to raise the bath temperature to 80° C. or above, and the rate of descaling is unsatisfactory. This method thus cannot replace the step of pickling with a nitric-hydrofluoric acid.

The method of the present invention makes it possible to descale metal sheets in a far more efficient manner than with a nitric-hydrofluoric acid by carrying out anodic electrolysis of the metal sheets in a usual manner but with sliding an abrasive member on the surface of the metal sheets and by selecting an electrolytic voltage in an adequate manner, without any of the problems mentioned above or without heating of the electrolytic bath.

Various other objects, features and attendant advantages of the present invention will be more fully appreciated as the same becomes better understood from the following detailed description when considered in connection with the accompanying drawings in which like reference characters designate like or corresponding parts through the several view and wherein:

DETAILED DESCRIPTION OF THE PREFERRED EMBODIMENTS

Figure 1:
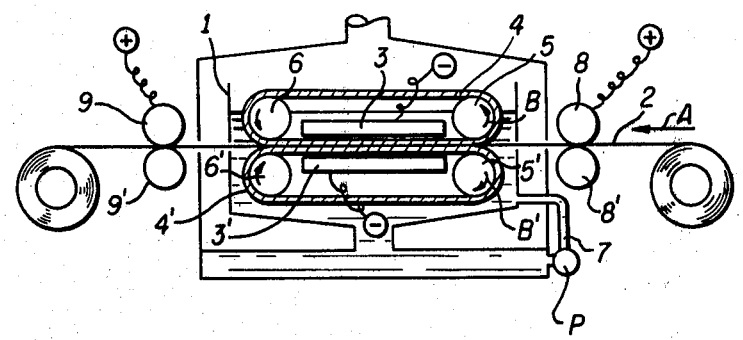
FIG. 1 is a sectional view of an electrolysis apparatus utilized in the present invention.

The electrolytic solution to be used in the present invention may be selected from a variety of conventional pickling solutions other than problematic ones such as a nitric-hydrofluoric acid solution which requires a high anticorrosive treatment equipment. Thus, for example, it may be a solution containing hydrobromic, hydroiodic, hydrochloric, sulfuric or nitric acid or a mixture of these or a neutral salt of the acid or a mixture thereof.

The metal sheets to be treated are immersed in one of the above mentioned electrolytic solutions as anodes opposite to a cathode and an electric current is allowed to flow between the electrodes. In the case of titanium sheets, an electric current flows through the defective portions of the titanium oxide (scale) layer on the titanium sheet anode surface and the titanium material is partly dissolved by the reactions.

$$Ti \rightarrow Ti^{2+} + 2e^-, Ti^{2+} \rightarrow Ti^{3+} + e^-.$$

The resulting $Ti^{2+}$ and/or $Ti^{3+}$ ions are further converted to $Ti_2O_3$ and/or $TiO_2$ in accordance with such reactions as $$2Ti^{2+} + 3H_2O = Ti_2O_3 + 6H^+ + 2e^-$$

$$Ti^{2+} + 2H_2O = TiO_2 + 4H^+ + 2e^-$$

$$2Ti^{3+} + 3H_2O = Ti_2O_3 + 6H^+$$

$$Ti^{3+} + 2H_2O = TiO_2 + 4H^+ + e^-.$$

The $Ti_2O_3$ and/or $TiO_2$ blocks or closes the defective parts of the titanium oxide layer on the sheet surface, whereby the electric current flow is obstructed and the rate of pickling is thereby decreased. Similarly, in the case of stainless steel sheets, too, an oxide film is formed on the stainless steel surface, obstructs the current flow and causes a decrease in pickling rate.

For inhibiting such passivation of the metal sheet surface by metal oxides, an abrasive member is disposed in accordance with the invention so that the abrasive member is in contact with the metal sheet surface. By sliding the abrasive member on the sheet surface, metal ions in the neighborhood of the sheet surface, such as $Ti^{2+}$ and/or $Ti^{3+}$ (for titanium sheets) or $Fe^{3+}$, $Cr^{6+}$, $Ni^{2+}$, etc. (for stainless steel sheets), are caused to diffuse and leave the sheet surface by the stirring action of the sliding abrasive members and at the same time the metal oxides formed on the sheet surface are scraped off by the abrasive action of the sliding abrasive member, whereby efficient descaling can be attained.

The conditions of the above-mentioned anodic electrolysis may be within the normal range for a usual anodic electrolysis. However, the anodic current density can be increased, preferably to about 4 A/cm² or more, without any special problem, whereby the rate of electrolysis (quantity of scales removed per unit time period) can be increased and thereby a highly efficient descaling effect can be obtained. Therefore, the method of the invention is very effective in continuously treating stainless steel sheets, for instance, while feeding the sheets at a line speed of about 1–20 meters per minute (which corresponds to an electrolysis time of about 0.1–3 minutes).

Referring to FIG. 1, in which an electrolytic pickling apparatus for use in the practice of the invention is shown, reference number 1 denotes a vessel for an electrolytic solution, 2 indicates a metal sheet (e.g. titanium sheet) being fed in the direction of the arrow A at an adequate velocity, 3 and 3' are cathodes facing the metal sheet, and 4 and 4' indicates an abrasive means each disposed so as to be in contact with the surface of the metal sheet. The abrasive member are, for example, brush belts mounted on rollers 5, 5' and 6, 6', respectively, and made to slide along the sheet surface at an adequate velocity relative to the metal sheet, which is moving in the direction of A, by rotation of the rolls in the direction of B. The solution in the vessel is circulated by a pump P through a circulation path 7 so that the metal sheet can always come into contact with a fresh electrolytic solution.

A titanium sheet 2, for instance, fed to vessel 1 for the electrolytic solution undergoes electrolytic pickling effected by an anodic current supplied by means of the electricity transmitting rollers 8, 8' and 9, 9', whereby the sheet surface is descaled. As mentioned above, the $Ti^{2+}$ and/or $Ti^{3+}$ ions formed by this anodic electrolysis are removed from the region in the vicinity of the titanium sheet surface, and therefore electrolytic descaling is effected without passivation of the sheet surface due to $Ti_2O_3$ and/or $TiO_2$ resulting from reactions of the $Ti^{2+}$ and/or $Ti^{3+}$ ions. The $Ti^{2+}$ and/or $Ti^{3+}$ ions carried away from the region in the vicinity of the sheet surface react with water in the solution to form $Ti_2O_3$ and/or $TiO_2$, which precipitates and accumulates on the bottom of the vessel. The electrolysis is carried out, for example, by feeding a titanium sheet to a vessel having a length of about 6 meters and containing a 4% hydrochloric acid solution as an electrolytic solution at a line speed of about 1–20 meters per minute (which corresponds to an electrolysis time of about 0.1–3 minutes) while supplying an electric current at an anodic current density of about 14–222 A/dm². The titanium sheet feeding velocity is adjusted adequately depending on the state of scales on the sheet surface. For example, for sheets having a relatively thick oxide layer, such as hot coils after hot stripping, said velocity is adjusted such that the electrolysis time in the electrolytic bath is relatively long, whereas sheets having a relatively thin oxide layer, such as sheets after cold rolling, can be treated at a relatively high feeding rate with a short period of electrolysis.

Figure 2:
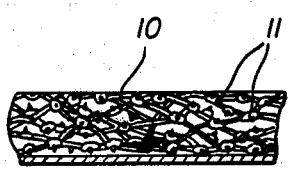
FIG. 2 is a schematic view of an abrasive member suited for use in the present invention.
Figure 5:
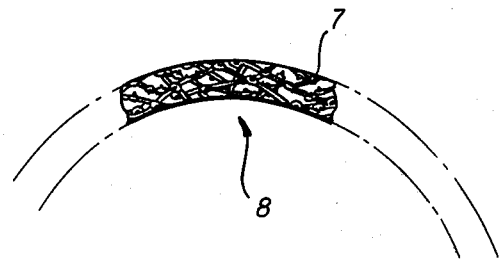
FIG. 5 is a sectional view of another suitable example of the abrasive means for use in the present invention.

The abrasive member to be used in the electrolytic pickling in accordance with the present invention is, for example, an emery cloth, an abrasive belt, an abrasive brush or an abrasive roll. An abrasive belt and abrasive roll are particularly effective and suited for continuous treatment. The abrasive member should preferably be of a nonconducting material so that an electric current does not flow through the abrasive member, which is situated between the anode and cathode, but flows through the electrolytic solution contained in the abrasive member to effect anodic electrolysis of the metal on the metal sheet surface. The abrasive belt per se or on a roll, at least on the side to come into contact with the metal sheet surface, is desirably of a nylon, for instance. As can be seen in FIG. 2 or FIG. 5, a suitable abrasive belt per se or on a roll is made by three-dimensionally entangling synthetic fibers 10 (in FIG. 2) and fixing the points of intersection of one fiber being fixed with another by fusion or by means of an adhesive agent 11 (in FIG. 2) for preventing deformation the nonwoven fabric.

Figure 3:
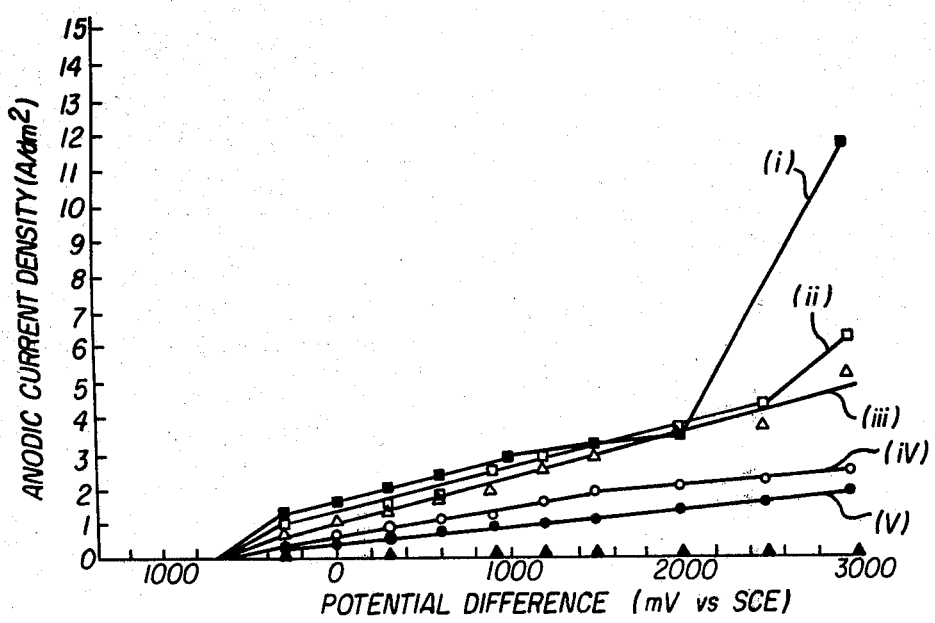
FIG. 3 is a graphic representation of the relation between the anodic current density and the anode-cathode potential difference in an electrolytic pickling treatment of titanium sheets.

In FIG. 3 is shown the relation between the anode-cathode potential difference (counter electrode: titanium) [mV vs SCE (standard calomel electrode)] and the anodic current density (A/dm$^2$) for the case where an electrolytic treatment (electrolytic solution: 4% hydrochloric acid) was carried out with a variety of abrasive member. A higher position of the curve indicates that a better abrasive effect can be obtained, that passivation of the titanium sheet surface is more effectively suppressed and that descaling pickling can be performed in a more efficient manner. Curve (i) is for the situation where a nylon abrasive belt ("Scoth-Brite" No. 800, Sumitomo Chemical Co.) was used, curve (ii) for the situation where a nylon scrubbing brush ("Scoth-Brite" No. 600, Sumitomo Chemical Co.) was used, curves (iii), (iv) and (v) for the situations where emery clothes No. 800, No. 400 and No. 80, respectively, were used, and curve (vi) for the situation where an abrasive buff was used. It is seen from FIG. 3 that buffing is almost ineffective, that coarser emery clothes produces better descaling effects and that descaling treatment can be conducted most efficiently with the nylon abrasive belt.

The surface oxide layer of titanium hot coils has a thickness of about 50 microns or more. Therefore, it is advantageous to preliminarily treat the sheet surface by a usual surface roughening method such as shot blasting. Such preliminary treatment can mechanically peel off and remove the oxide layer to a certain extent and at the same time causes cracking of the oxide layer, so that penetration of the electrolytic solution into the oxide layer is promoted and the efficiency of the electrolytic pickling is improved. For cold coils, too, similar preliminary treatment can reduce the electrolysis time, although the oxide layer is relatively thin, for example, about 5 microns.

The Ti$^{3+}$ ions resulting from dissolution of anode titanium sheet surface react with water in the solution to form TiO$_2$, which precipitates on the bottom of the vessel for the electrolytic solution and thus separated out of the system. As a result, the electrolytic solution does not change in the composition thereof but can be used for the electrolytic treatment repeatedly for a long period of time.

The effect of the electrolytic descaling can be evaluated based on the surface roughness of the treated titanium sheet. If the extent of electrolysis is insufficient, the surface is rougher. Generally, hot coils are desired to have an average roughness (Ra) of about 8 microns or less when determined according to the JIS surface roughness measurement method. Cold sheets as products are desired to have an Ra value of about 5 microns or less. In accordance with the invention, the above requirements can be satisfied by a short period of electrolytic treatment performed under adequately selected conditions following an adequately added preliminary surface treatment such as shot blasting.

Figure 4:
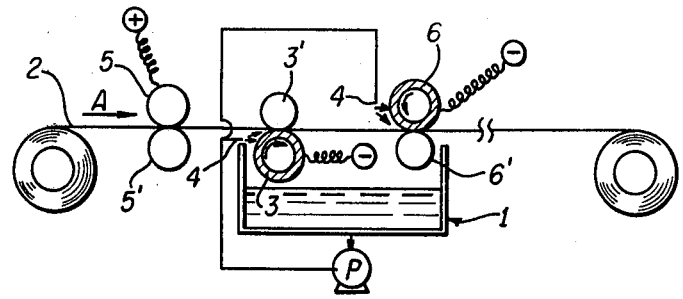
FIG. 4 is a sectional view of another electrolysis apparatus utilized in the present invention.

Referring to FIG. 4, the apparatus for electrolytic pickling shown therein is suited, for example, for continuous treatment of stainless steel sheets. In FIG. 4, reference number 1 denotes a vessel for an electrolytic solution, and a stainless steel sheet 2 is fed over said vessel in the direction of A for electrolytic treatment. Stainless steel sheet 2 passes between and come into contact with a pair of rolls 5, 5 for electricity transmission prior to coming over vessel 1, then passes between a set of a first abrasive roll 3 (lower) and a backup roll 3' (upper) situated over the vessel and rotating so as to jointly deliver the stainless steel sheet, and further passes between a set of a second abrasive roll 6 (upper) and a backup roll 6' while undergoing an abrading action of said abrasive roll. After necessary aftertreatment (not shown in the figure), the sheet is wound up. Abrasive rolls 3 and 6 are each made of a nonwoven fabric sheet 7, the composing fiber of which being fixed by fusion or with an adhesive agent, such as mentioned above, and a roll-shaped cathode 8 which bears said fabric sheet 7, as shown FIG. 5. Cathode 8 electrically comes into contact with the stainless steel sheet 2 by intermediation of the electrolytic solution retained among fibers of the fabric sheet 7. Therefore, connection of the above-mentioned pair of rolls 5, 5 with the positive terminal of a power source and of the abrasive rolls 3 and 6 with the negative terminal and spraying of the electrolytic solution over both the surface of the stainless steel sheet through nozzles 4 and 4' by the action of a pump P make it possible to carry out anodic electrolysis on both the surface of the stainless steel sheet while the sheet is moved in the direction of A. One surface of stainless steel sheet 2 is subjected to surface abrasion exerted by first abrasive roll 3 and the other surface is subjected to abrasion action by the second abrasive roll 6 as a result of rubbing of the sheet surface therewith. A desired degree of descaling is accomplished by repeating this as a unit procedure.

In the case of hot coils, thickness of the surface layer to be removed from the stainless steel sheet amounts to about 40 microns or more. Therefore, it is advantageous to preliminarily treat the sheet surface by a usual surface roughening method such as shot blasting. Such treatment can mechanically peel off the oxide layer to some extent and causes cracking of the oxide layer, so that penetration of the electrolytic solution into the layer is promoted and the efficiency of the electrolytic pickling is further improved.

EXAMPLES 1–12

Titanium sheets were electrically treated in an electrolysis apparatus as shown in FIG. 1 using 4% hydrochloric acid as the electrolytic solution and, as the abrasive means, brush belts each having a nylon abrasive belt on the surface thereof which comes into contact with the titanium sheet. The results obtained in typical runs are shown in Table 1. In Examples 1–8, cold sheets were treated and in Examples 9–12, hot coils were treated. In Examples 11 and 12, the hot coils were preliminarily treated by shot blasting. (In the remaining examples, shot blasting was not conducted.) In all the examples, the electrolytic treatment was carried out for 3 minutes.

TABLE 1

| Ex. No. | Conditions of electrolysis | | Electrolytic Pickling | | | | Remarks |
|---|---|---|---|---|---|---|---|
| | | | Degree of scale removal by electrolysis | | Surface roughness | | |
| | Current density (A/dm$^2$) | Anode-cathode voltage (V) | Overall removal ($\mu$) | Rate of removal ($\mu$/min.) | Average ($\mu$) | Maximum ($\mu$) | |
| 1 | 13.9 | 4.4 | 9.0 | 3.0 | 1.8 | 10.0 | Cold coils |
| 2 | 27.8 | 4.8 | 15.9 | 5.3 | 2.8 | 14.0 | |
| 3 | 55.6 | 6.0 | 30.3 | 10.1 | 3.3 | 18.0 | |
| 4 | 83.3 | 6.5 | 44.7 | 14.9 | 3.8 | 18.0 | |
| 5 | 111.1 | 7.5 | 57.3 | 19.1 | 2.8 | 16.0 | |
| 6 | 138.9 | 8.0 | 69.6 | 23.2 | 3.0 | 15.0 | |
| 7 | 55.6 | 6.0 | 29.1 | 9.7 | 3.5 | 20.0 | |
| 8 | 222.2 | 10.3 | 110.7 | 36.9 | 2.4 | 12.0 | |
| 9 | 111.1 | 11.7 | 55.2 | 18.4 | 15–25 | 110 | Hot sheets |
| 10 | 222.2 | 14.0 | 112.2 | 37.4 | 19–26 | 115 | |
| 11 | 111.1 | 10.0 | 55.6 | 18.5 | 4–6 | 30 | |
| 12 | 222.2 | 12.3 | 112.0 | 37.3 | 4–5 | 22 | |

The data in Table 1 indicate that, for both the hot coils and cold sheets, the rate of electrolytic descaling (thickness of scale layer removed in unit time period, microns per minute) is about 3 microns or more and that faster descaling is possible as compared with the conventional method using a nitric-hydrofluoric acid. For example, in Example 8 in which an increased current density was employed, the rate of descaling was 12-fold as high as that obtainable with a nitric-hydrofluoric acid (about 3 microns/minute). As for the surface condition of the descaled sheet, the average surface roughness (Ra) for cold sheets did not exceed 4.0 microns, with the maximum roughness (Rmax) being less than about 20 microns. Satisfactory descaling effects were thus obtained by the short period (3 minutes) of treatment. As for hot coils, the descaling effects were not very satisfactory in Examples 9 and 10 in which shot blasting was not performed, the average roughness (Ra) exceeding about 15 microns. However, descaling to a desired surface roughness can easily be achieved by prolonging the treatment period to some extent, since, as mentioned above, the rate of electrolytic descaling is high.

EXAMPLES 13–18

Figure 6:
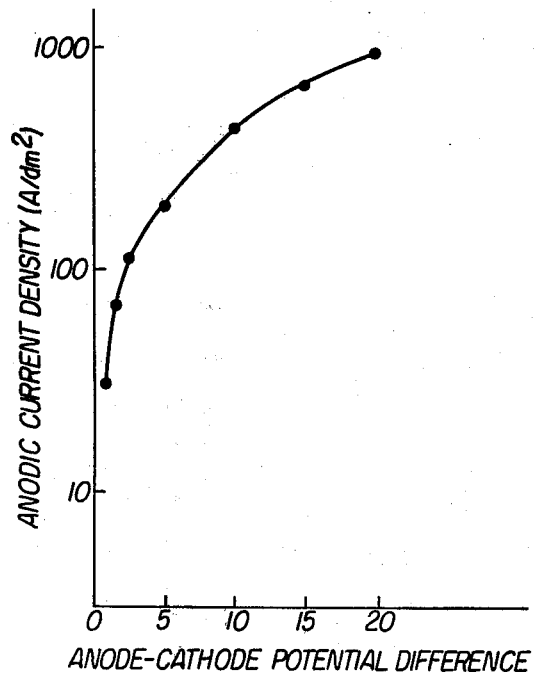
FIG. 6 is a graphic representation of the relation between the anodic current density and the anode-cathode potential difference in an electric pickling treatment of stainless steel sheets.

Stainless steel sheets were subjected to anodic electrolysis in an electrolysis apparatus as shown in FIG. 4 using 4% hydrochloric acid at room temperature as the electrolytic solution and nylon abrasive rolls as shown in FIG. 5. The relation between the anode-cathode voltage for said abrasive rolls (counter electrode: stainless steel) and the anodic current density was as shown in FIG. 6. The rates of electrolytic descaling at given anodic current densities were as shown in Table 2.

TABLE 2

| Example No. | Conditions of electrolysis | | Rate of electrolytic descaling (microns per minute) |
|---|---|---|---|
| | Current density (A/dm$^2$) | Anode-cathode voltage (V) | |
| 13 | 20 | 1.5 | 9 |
| 14 | 115 | 2.5 | 24 |
| 15 | 190 | 5.0 | 37 |
| 16 | 430 | 10.0 | 86 |
| 17 | 670 | 15.0 | 137 |
| 18 | 920 | 20.0 | 165 |

The above results indicate that, in each of Examples 13–18, better descaling was achieved as compared with the conventional method using a nitric-hydrofluoric acid wherein the rate of electrolytic descaling is about 2.3 microns per minute. In Example 18, for instance, in which an increased current density was employed, the rate of electrolytic descaling was 7.2 times as high as that obtainable by the conventional method with a nitric-hydrofluoric acid.

In the foregoing examples, hydrochloric acid was used as the electrolytic solution. In addition to the acid, hydrobromic, hydroiodic, sulfuric and nitric acid, mixtures thereof, and solutions of neutral salts thereof can also be used for achieving satisfactory descaling effects with rates of electrolytic descaling at least comparable to the conventional method using a nitric-hydrofluoric acid.

As mentioned in the foregoing, it is possible in accordance with the present invention to use ordinary pickling solution such as hydrochloric, hydrobromic and sulfuric acid or solutions of neutral salts of such acids for achieving an improved descaling efficiency as compared with the conventional method using a highly corrosive nitric-hydrofluoric mixed acid. Lower costs of equipment and ease of maintenance are further advantageous over said conventional method. Furthermore, the rate of descaling is higher than in such conventional method, and therefore faster and more efficient treatment is possible. In the case of titanium sheets, Ti$_2$O$_3$ and/or TiO$_2$ can be recovered as a precipitate from the electrolytic bath and used as a valuable titanium source, whereas, theoretically, the electrolytic solution can maintain its original composition and therefore need not be supplemented or exchanged, which is very advantageous from an economical viewpoint. The descaling efficiency can be adjusted by controlling the anodic current density, and therefore the method of the invention is very useful for continuous treatment of stainless steel sheets. The method of the invention can also be applied to descaling of sheets of such metals as zirconium, niobium and tantalum.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of descaling metal sheets which comprises carrying out anodic electrolysis using a metal sheet as the anode while sliding a nonconducting abrasive means relatively to and on the surface of said metal sheet in an electrolytic solution selected from the group consisting of hydrobromic, hydroiodic, hydrochloric, sulfuric or nitric acid or a mixture therof, and a neutral salt thereof and at an anodic current density above 4 A/dm$^2$.

2. The method of claim 1, wherein that side of said abrasive means which comes into contact with the metal sheet surface essentially comprises a fabric-like material made of synthetic resin.

3. The method of claim 1, which further comprises subjecting said metal sheet to said electrolysis after surface roughening treatment thereof.

4. The method of claim 3, wherein said metal sheet comprises a stainless steel sheet.

5. The method of claim 3 wherein said surface roughening treatment comprises shot blasting the metal sheet surface.

6. The method of claim 3, wherein said metal sheet comprises a titanium sheet.

7. The method according to claim 6, wherein said anodic electrolysis is carried out at an anodic current density of about 14–222 A/dm$^2$.

* * * * *